United States Patent
Takahashi et al.

(10) Patent No.: US 9,608,449 B2
(45) Date of Patent: Mar. 28, 2017

(54) POWER SYSTEM AND CONTROL METHOD OF THE POWER SYSTEM

(71) Applicants: Shingo Takahashi, Tokyo (JP); Yasuhiro Ishikawa, Kanagawa (JP); Kazuaki Honda, Kanagawa (JP)

(72) Inventors: Shingo Takahashi, Tokyo (JP); Yasuhiro Ishikawa, Kanagawa (JP); Kazuaki Honda, Kanagawa (JP)

(73) Assignee: NEC Corporation, Tokyo (JP)

( * ) Notice: Subject to any disclaimer, the term of this patent is extended or adjusted under 35 U.S.C. 154(b) by 186 days.

(21) Appl. No.: 14/361,426

(22) PCT Filed: Nov. 14, 2012

(86) PCT No.: PCT/JP2012/079517
§ 371 (c)(1),
(2) Date: May 29, 2014

(87) PCT Pub. No.: WO2013/080797
PCT Pub. Date: Jun. 6, 2013

(65) Prior Publication Data
US 2014/0327316 A1 Nov. 6, 2014

(30) Foreign Application Priority Data

Nov. 30, 2011 (JP) ................................. 2011-261982

(51) Int. Cl.
*H02J 1/00* (2006.01)
*H02J 3/00* (2006.01)
(Continued)

(52) U.S. Cl.
CPC ............ *H02J 3/46* (2013.01); *H01M 10/425* (2013.01); *H01M 10/441* (2013.01);
(Continued)

(58) Field of Classification Search
CPC ............ H01M 10/425; H01M 10/441; H01M 10/482; H02J 3/46; H02J 7/0016; H02J 7/0021; H02M 7/493; Y10T 307/707
(Continued)

(56) References Cited

U.S. PATENT DOCUMENTS

| 5,161,097 A | 11/1992 | Ikeda | |
| 6,503,649 B1 * | 1/2003 | Czajkowski | ...... H01M 8/04947 |
| | | | 429/430 |
| 2010/0001583 A1 | 1/2010 | Ichikawa | |

FOREIGN PATENT DOCUMENTS

| CA | 2 664 232 A1 | 5/2008 |
| JP | 05-137267 A | 6/1993 |

(Continued)

OTHER PUBLICATIONS

International Search Report corresponding to PCT/JP2012/079517 dated Jan. 22, 2013 (5 pages).

*Primary Examiner* — Rexford Barnie
*Assistant Examiner* — Toan Vu
(74) *Attorney, Agent, or Firm* — Wilmer Cutler Pickering Hale and Dorr LLP

(57) ABSTRACT

Provided is a power system that can arbitrarily set output power while stabilizing output voltages. Connection terminals 13 and 23 of lower power sources 1 and 2 are connected to external connection terminals 41 in parallel. Voltage measurement section 31 measures voltage values of external connection terminals 41 as measured voltage values. Power converters 12 and 22 measure power supply capacities of lower power sources 1 and 2, respectively. Output instruction section 32 adjusts power or currents flowing through connection terminals 13 and 23 based on the measured voltage values and the power supply capacities so that the measured voltage values are included in a predetermined voltage range.

17 Claims, 11 Drawing Sheets

(51) Int. Cl.
  *H02J 3/46*    (2006.01)
  *H01M 10/44*   (2006.01)
  *H01M 10/48*   (2006.01)
  *H02J 7/00*    (2006.01)
  *H02M 7/493*   (2007.01)
  *H01M 10/42*   (2006.01)

(52) U.S. Cl.
  CPC ......... *H01M 10/482* (2013.01); *H02J 7/0016* (2013.01); *H02J 7/0021* (2013.01); *H02M 7/493* (2013.01); *Y10T 307/707* (2015.04)

(58) Field of Classification Search
  USPC .......................................................... 307/82
  See application file for complete search history.

(56) References Cited

FOREIGN PATENT DOCUMENTS

| | | |
|---|---|---|
| JP | 2000-036320 A | 2/2000 |
| JP | 2001-095232 A | 4/2001 |
| JP | 2002-165383 A | 6/2002 |
| JP | 2004-147477 A | 5/2004 |
| JP | 2004-260955 A | 9/2004 |
| JP | 2005-168107 A | 6/2005 |
| JP | 2008-109756 A | 5/2008 |
| JP | 2009-069056 A | 4/2009 |
| JP | 2009-232674 A | 10/2009 |
| WO | WO-2008/050601 A1 | 5/2008 |

* cited by examiner

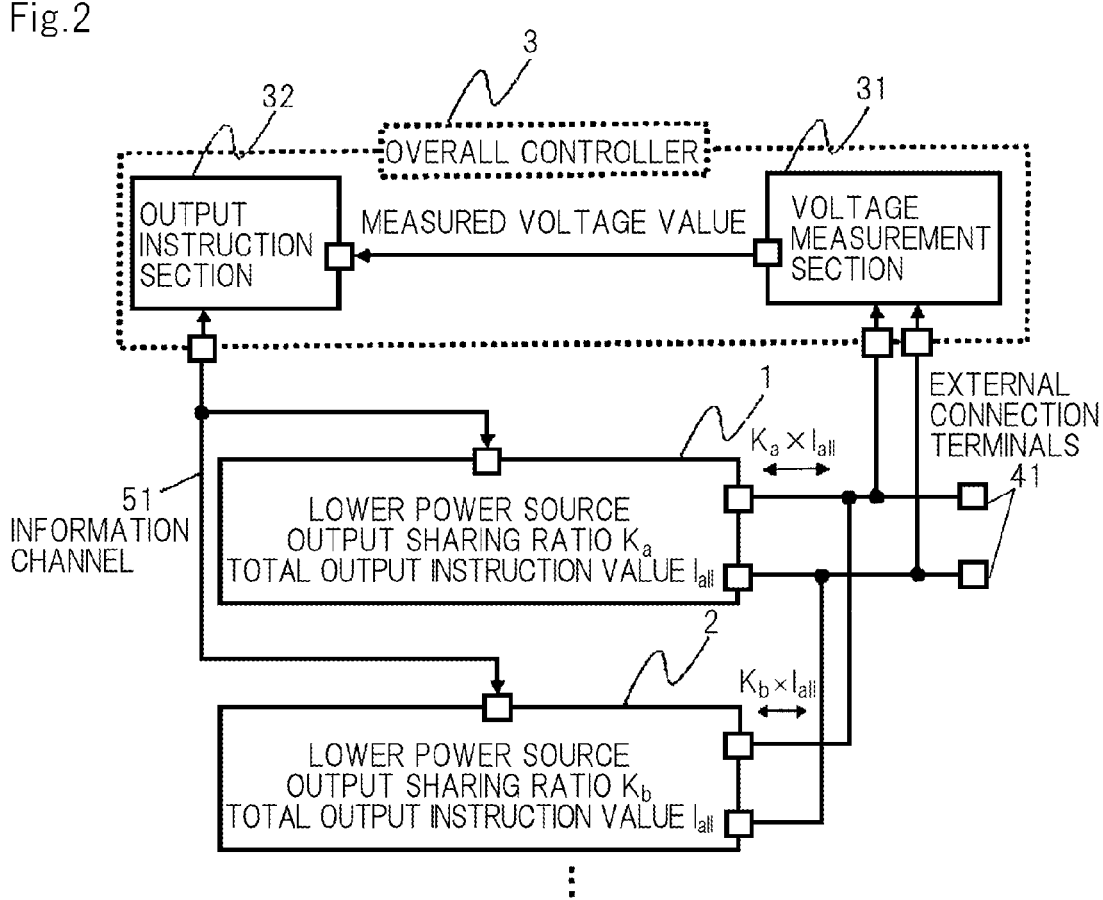

| OPERATION STATE | DISCHARGE | NO CHARGE OR DISCHARGE | CHARGE |
|---|---|---|---|
| TOTAL OUTPUT INSTRUCTION VALUE | $I_{all} > 0$ | $I_{all} = 0$ | $I_{all} < 0$ |
| TOTAL OUTPUT CURRENT OF LOWER POWER SOURCE $(K_a + K_b) \times I_{all}$ | DISCHARGE | NO CHARGE OR DISCHARGE | CHARGE |
| OUTPUT CURRENT OF LOWER POWER SOURCE 1 $K_a \times I_{all}$ | DISCHARGE | NO CHARGE OR DISCHARGE | CHARGE |
| OUTPUT CURRENT OF LOWER POWER SOURCE 2 $K_b \times I_{all}$ | DISCHARGE | NO CHARGE OR DISCHARGE | CHARGE |

Fig.5

| OPERATION STATE | DISCHARGE | NO CHARGE OR DISCHARGE | CHARG |
|---|---|---|---|
| TOTAL OUTPUT INSTRUCTION VALUE | $I_{all} > 0$ | $I_{all} = 0$ | $I_{all} < 0$ |
| TOTAL OUTPUT CURRENT OF LOWER POWER SOURCE $(K_a + K_b + \cdots) \times I_{all}$ | DISCHARGE | NO CHARGE OR DISCHARGE | CHARGE |
| OUTPUT CURRENT OF LOWER POWER SOURCE 1 $K_a \times I_{all}$ | DISCHARGE | NO CHARGE OR DISCHARGE | CHARGE |
| OUTPUT CURRENT OF LOWER POWER SOURCE 2 $K_b \times I_{all}$ | CHARGE | NO CHARGE OR DISCHARGE | CHARGE |

Fig.7

| OPERATION STATE | DISCHARGE | NO CHARGE OR DISCHARGE | CHARGE |
|---|---|---|---|
| TOTAL OUTPUT INSTRUCTION VALUE | $I_{all} > 0$ | $I_{all} = 0$ | $I_{all} < 0$ |
| TOTAL OUTPUT CURRENT OF LOWER POWER SOURCE $(K_a + K_b) \times I_{all}$ | NO CHARGE OR DISCHARGE | NO CHARGE OR DISCHARGE | NO CHARGE OR DISCHARGE |
| OUTPUT CURRENT OF LOWER POWER SOURCE 1 $K_a \times I_{all}$ | DISCHARGE | NO CHARGE OR DISCHARGE | CHARGE |
| OUTPUT CURRENT OF LOWER POWER SOURCE 2 $K_b \times I_{all}$ | CHARGE | NO CHARGE OR DISCHARGE | DISCHARGE |

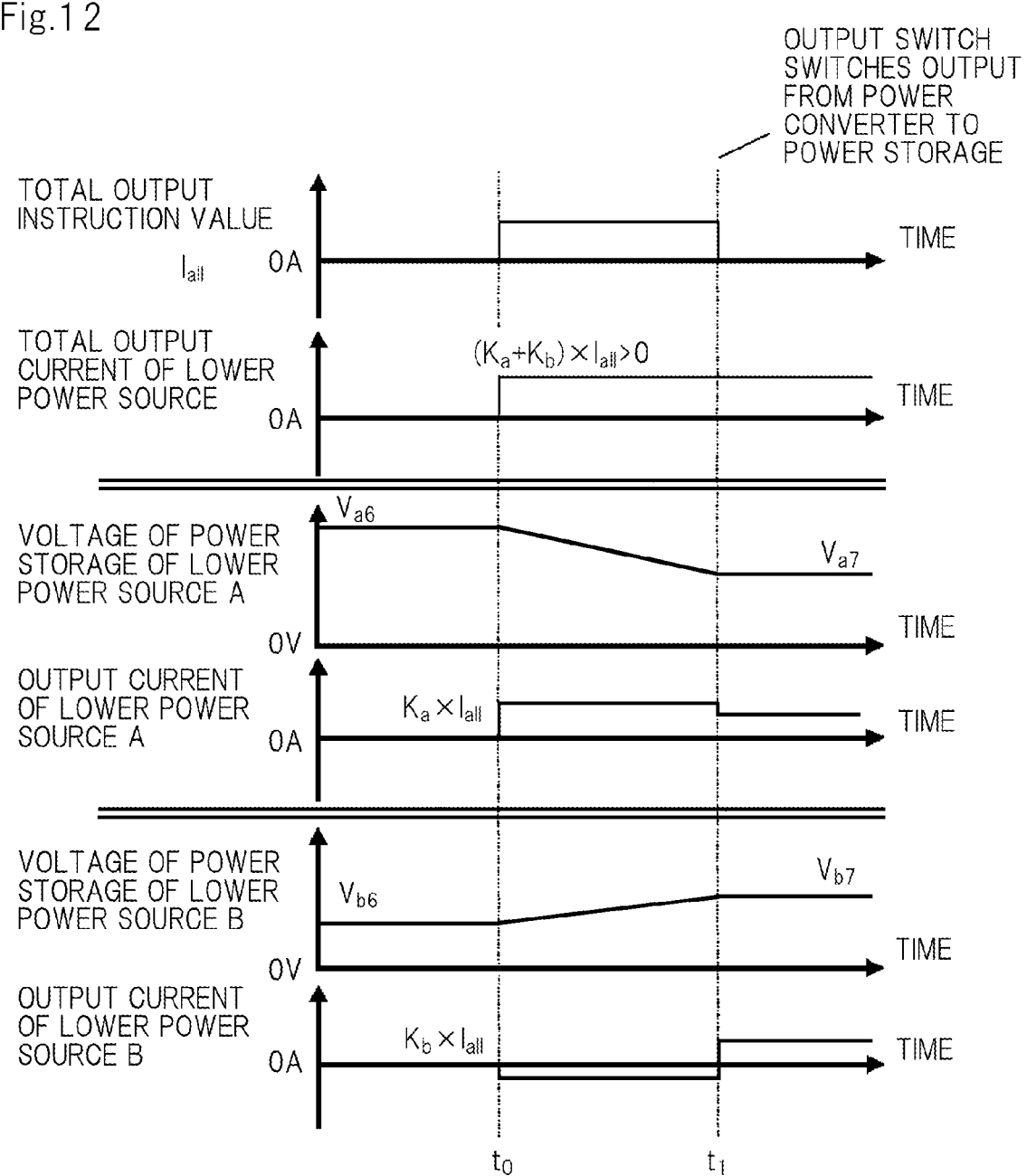

POWER SYSTEM AND CONTROL METHOD OF THE POWER SYSTEM

CROSS-REFERENCE TO RELATED APPLICATIONS

This application is a national stage application of International Application No. PCT/JP2012/079517 entitled "Power System and Control Method of the Power System," filed on Nov. 14, 2012, which claims the benefit of the priority of Japanese Patent Application No. 2011-261982, filed on Nov. 30, 2011, the disclosures of each of which are hereby incorporated by reference in their entirety.

TECHNICAL FIELD

The present invention relates to a power system including power sources connected in parallel and to a control method of the power system.

BACKGROUND ART

In recent years, a power generation system using renewable energy, such as solar energy and wind energy, is drawing attention. However, in the power generation system, the amount of power generation is significantly affected by the weather, environment, and the like, and stable supply of power to an existing power distribution network and consumers, such as households, is difficult to achieve. Therefore, a technique capable of stable supply of power to the power distribution network and the consumers by using the power generation system is being developed.

A technique of controlling output power that is output from a power supply source, such as a power generation apparatus like a solar panel and a power storage that accumulates power generated by the power generation apparatus, is proposed as a technique for stable supply of power. The technique allows stable supply of power by supplying power to the power distribution network with the output power of the power generation apparatus or the power storage held constant or by supplementing insufficient power with power from the power storage when the power demand of the consumers exceeds the current power generation amount.

To realize the technique for a stable supply of power, a power source that has a combination of a power supply source and a power converter that controls the output power of the power supply source is necessary.

It is desirable that the power converter included in the power source be compatible with a high voltage high current. However, there are limitations in the volume of a passive element used in the power converter, the heat radiation efficiency of a switching element, and the like, and it is difficult to realize the power converter corresponding to the high voltage high current.

Meanwhile, proposed is a method of constructing a power system, in which constant voltage power sources including power converters corresponding to a high voltage low current that can be easily realized are connected in parallel to thereby handle a high voltage high current.

However, when the constant voltage power sources are connected in parallel, there are minute differences between output voltages of the constant voltage power sources, and as a result, a theoretically infinite current called a cross current may be generated between the constant voltage power sources. When the cross current is generated, there are problems in which the output currents of the constant voltage power sources become unbalanced, the output voltages of the constant voltage power sources become unstable, and the lifetime of the constant voltage power source is reduced.

A method of connecting resistors to connection terminals of the constant voltage power sources to bring the output voltages of the constant voltage power sources into line (see Patent Literature 1) and a method of connecting diodes to the connection terminals to prevent cross current are proposed to solve the problems. However, in the methods, the registers and the diodes connected to the connection terminals of the constant voltage power sources cause heat loss in which power is converted to heat, and the efficiency of supplying power is reduced. Although a method of controlling the power converters in the constant voltage power sources in a coordinated manner to bring the output voltages of the constant voltage power sources into line is also proposed, a stable supply of power may not be possible in the method if any of the constant voltage power sources breaks down, and the entire power system may not operate normally.

A power system including constant current power sources, in place of the constant voltage power sources, connected in parallel is also possible. In the power system, even if one of the constant current power sources breaks down, a stable supply of power is possible by using other constant current power sources. However, in the technique, there is a problem in which the output power of the power system is not stable.

Meanwhile, Patent Literature 2 and 3 describes techniques, in which only one of the power sources connected in parallel is a constant voltage power source, and the rest are constant current power sources. In the techniques, the output voltages of the constant current power sources are mixed with the output voltage of the constant voltage power source, and output currents in a preset size are output from the constant current power sources. As a result, while the output power of the power system is held constant, a stable supply of power is possible by using other constant current power sources even if one of the constant current power sources breaks down.

CITATION LIST

Patent Literature

Patent Literature 1: JP2005-168107A
Patent Literature 2: JP2009-232674A
Patent Literature 3: JP2001-95232A

SUMMARY OF INVENTION

Technical Problem

However, in the techniques described in Patent Literature 2 and 3, the output currents of the constant current power sources cannot be individually controlled, and currents in a preset size are output from the constant current power sources. Therefore, the output currents need to be maintained at a certain value or greater. As a result, the output currents or the output power may not be able to be set to a desired value.

When power storages sources are used as power supply sources of the constant current power sources, there is also a problem in which the charging rates of the power storages sources in the constant current power sources cannot be individually controlled, because the output currents of the constant current power sources cannot be individually controlled. Therefore, when power sources including power storages sources with different charge and discharge performances, charging rates, degradation degrees, and the like are connected in parallel, there is a problem in which the performance of the entire power system is limited to the battery having the lowest performance, and the performances of the other power storages sources cannot be effectively utilized.

The present invention has been made in view of the foregoing circumstances, and an object of the present invention is to provide a power system that can arbitrarily set output power while stabilizing output voltages, and to a control method of the power system.

Solution to Problem

The present invention provides a power system including power sources, connection terminals of said power sources connected to an external connection terminal in parallel, the power system including: a voltage measurement section that measures a voltage value of said external connection terminal as a measured voltage value; a capacity measurement section that measures a power supply capacity of each power source; and an adjuster that adjusts power or a current flowing through each connection terminal based on the measured voltage value and the power supply capacity so that the measured voltage value is included in a predetermined voltage range.

The present invention provides a control method of a power system including power sources, connection terminals of said power sources connected to an external connection terminal in parallel, the control method including: measuring a voltage value of said external connection terminal as a measured voltage value; measuring a power supply capacity of each power source; and adjusting power or a current flowing through each connection terminal based on the measured voltage value and the power supply capacity so that the measured voltage value is included in a predetermined voltage range.

Advantageous Effects of Invention

According to the present invention, output power can be arbitrarily set, while output voltages are stabilized.

BRIEF DESCRIPTION OF DRAWINGS

FIG. 2 is a diagram for explaining an example of operation of the power system of the first exemplary embodiment.

FIG. 3 is a diagram for explaining an example of operation states of the power system of the first exemplary embodiment.

FIG. 5 is a diagram for explaining another example of the operation states of the power system of the first exemplary embodiment.

FIG. 7 is a diagram for explaining another example of the operation states of the power system of the first exemplary embodiment.

FIG. 12 is a diagram for explaining an example of operation of the power system of the second exemplary embodiment.

DESCRIPTION OF EMBODIMENTS

Hereinafter, exemplary embodiments will be described with reference to the drawings. In the following description, the same reference signs are provided for the same functions, and description will be omitted in some cases.

Figure 1:
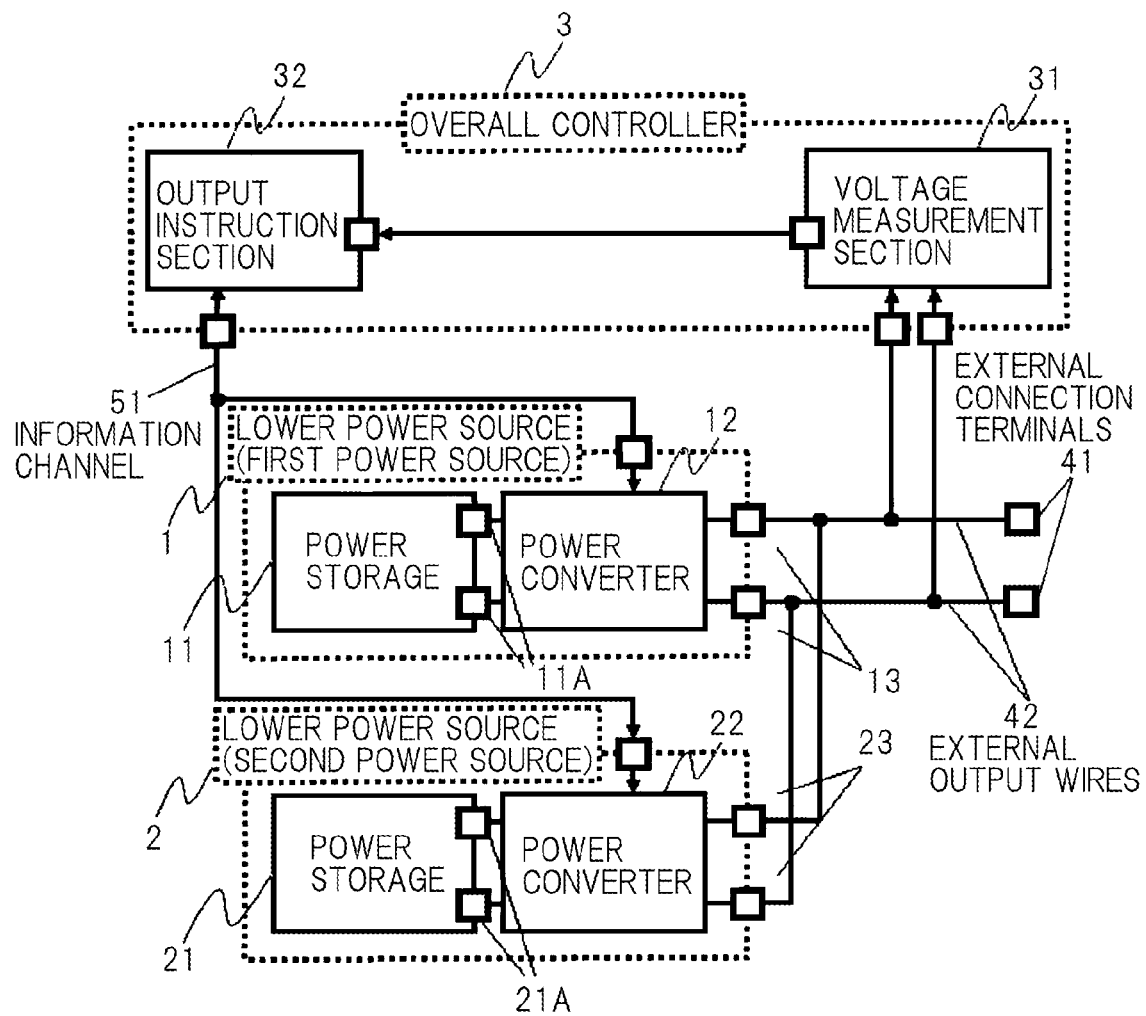
FIG. 1 is a block diagram showing a configuration of a power system of a first exemplary embodiment.

FIG. 1 is a block diagram showing a configuration of a power system of a first exemplary embodiment. In FIG. 1, the power system includes first power source 1, second power source 2, and overall controller 3. First power source 1 includes power storage 11 and power converter 12.

Power storage 11 is a power supply source that stores input power and that outputs the stored power. In place of power storage 11, first power source 1 may include a power generator that generates power and that outputs the generated power.

Power converter 12 controls charge and discharge of power storage 11. More specifically, overall controller 3 controls power converter 12, and power converter 12 changes the direction and the size of the power and the current flowing through connection terminal 11A of power storage 11 to thereby perform a charging operation for storing power in power storage 11 or a discharging operation for outputting power from power storage 11. The charging operation and the discharging operation may also be collectively called charging and discharging operation.

Power converter 12 measures the amount of power stored in power storage 11 as the power supply capacity of power storage 11 and notifies output instruction section 32 of the power storage amount. When the power generator is used in place of power storage 11, the power supply capacity is the power generation amount of the power generator.

Second power source 2 has the same function as first power source 1. More specifically, second power source 2 includes power storage 21 and power converter 22. Power storage 21 has the same function as power storage 11, and power converter 22 has the same function as power converter 12.

A pair of connection terminals 13 of first power source 1 and a pair of connection terminals 23 of second power source 2 are commonly connected and are connected to a pair of external connection terminals 41 through a pair of external output wires 42. Therefore, first power source 1 and second power source 2 are connected to external connection terminals 41 in parallel. External connection terminals 41 can be connected by an external apparatus not shown. The external apparatus may be an external load apparatus that consumes power from the power system or may be an external power source apparatus that supplies power to the power system.

First power source 1 and second power source 2 may be simply called power sources or lower power sources.

Although FIG. 1 illustrates a power system including two lower power sources, first power source 1 and second power source 2, provided that the power system includes a plurality of lower power sources, that would be sufficient. Hereinafter, first power source 1 will be called lower power source 1, and second power source 2 will be called lower power source 2.

Overall controller 3 controls lower power sources 1 and 2 to cause lower power sources 1 and 2 to function together as a constant voltage source and individually adjusts the output power or the output currents of lower power sources 1 and 2. More specifically, overall controller 3 includes voltage measurement section 31 and output instruction section 32, and the sections have the following functions.

Voltage measurement section 31 measures the voltage values of external connection terminals 41 as measured voltage values.

Output instruction section 32 is an example of an adjuster. Based on the measured voltage values measured by voltage measurement section 31 and the power storage amounts of power storages 11 and 12 measured by power converters 12 and 22, output instruction section 32 adjusts the power or the currents flowing through connection terminals 13 and 23 of lower power sources 1 and 2 so that the measured voltage values are included in the predetermined voltage range.

More specifically, output instruction section 32 is connected to power converters 12 and 22 of lower power sources 1 and 2 through information channel 51. Based on the measured voltage values and the power storage amounts, output instruction section 32 designates a total output instruction value, which indicates the total amount of power or the total amount of current flowing through external connection terminals 41, and outputs sharing ratios, which indicate ratios of amounts of power or amounts of current flowing through connection terminals 13 and 23 of lower power sources 1 and 2 to the total output instruction value, to power converters 12 and 22 of lower power sources 1 and 2 to thereby adjust the power or the currents flowing through connection terminals 13 and 23 of lower power sources 1 and 2.

The predetermined voltage range is, for example, a range in which a difference between a voltage command value determined according to an external apparatus connected to external connection terminals 41 and the measured voltage value is equal to or smaller than a predetermined value. The voltage command value may be requested from an external apparatus or may be determined in advance if the external apparatus connected to external connection terminals 41 is fixed.

FIG. 2 is a diagram for explaining an example of operation of the power system.

The power system executes the following operation when an external apparatus is connected to external connection terminals 41 or when an activation instruction is input to the power system from the outside.

First, voltage measurement section 31 measures measured voltage values and notifies output instruction section 32 of the measured voltage values. When the measured voltage values are received, output instruction section 32 determines a total output instruction value according to the measured voltage values so that the measured voltages are included in a predetermined voltage range and notifies power converters 12 and 22 of the total output instruction value and predetermined output sharing ratios, which are initial values, through information channel 51.

Hereinafter, the total output instruction value indicates the total amount of current flowing through external connection terminals 41, and the output sharing ratios indicate ratios of the amounts of current flowing through connection terminals 13 and 23 to the total amount of current. The total output instruction value and the output sharing ratios indicate the directions of the flow of current by signs. In the exemplary embodiment, the total output instruction value indicates a positive value when the current flows to external connection terminals 41 from the power source side toward the external apparatus side and indicates a negative value when the current flows to external connection terminals 41 from the external apparatus side toward the lower power source apparatus side. The output sharing ratio indicates a positive value when the current flows in the same direction as the direction of the flow of current indicated by the total output instruction value and indicates a negative value when the current flows in the direction opposite the direction of the flow of current indicated by the total output instruction value.

When the total output instruction value and the output sharing ratios are received, power converters 12 and 22 distribute currents according to the total output instruction value and the output sharing ratios to connection terminals 13 and 23. More specifically, defining the output sharing ratio of lower power source 1 as $K_a$, the output sharing ratio of lower power source 2 as $K_b$, and the total output instruction value as $I_{all}$, power converter 12 distributes, to connection terminal 13, a current of output instruction value $K_a \times I_{all}$ obtained by multiplying total output instruction value $I_{all}$ by sharing ratio $K_a$, and power converter 22 distributes, to connection terminal 23, a current of output instruction value $K_b \times I_{all}$ obtained by multiplying total output instruction value $I_{all}$ by sharing ratio $K_b$. Output sharing ratios $K_a$ and $K_b$ are −1 or more and 1 or less, and the total sum of the output sharing ratios is 1.

In this way, since the total output instruction value is determined so that the measured voltage is included in the predetermined voltage range, the entire power system operates as a constant voltage source based on the cooperative working of lower power sources 1 and 2. Each of lower power sources 1 and 2 outputs a current according to the output instruction value and operates as a constant current source. If the total output instruction value indicates a total amount of power, lower power sources 1 and 2 function as constant power sources.

FIGS. 3 to 8 are diagrams for explaining the operation states of the power system.

FIG. 3 is a diagram showing the operation states of the power system when total output instruction value $I_{all}$ is positive, zero, and negative, wherein output sharing ratios $K_a$ and $K_b$ are greater than 0, and sum $K_a+K_b$ is 1.

As shown in FIG. 3, when the total output instruction value is positive, lower power sources 1 and 2 distribute currents to connection terminals 13 and 23 from the lower power source side toward the external apparatus side, that is, perform a discharging operation of discharging power storages 11 and 12, and the total output current that is a sum of the currents flowing through external connection terminals 41 is the discharge current from the lower power source side toward the external apparatus side.

When the total output instruction value is zero, lower power sources 1 and 2 do not perform a charging and discharging operation, and the total output current is zero.

When the total output instruction value is negative, lower power sources 1 and 2 perform a charging operation for distributing currents to connection terminals 13 and 23 from the external apparatus side toward the lower power source side, and the total output current is the charge current from the external apparatus side toward the lower power source side.

Figure 4:
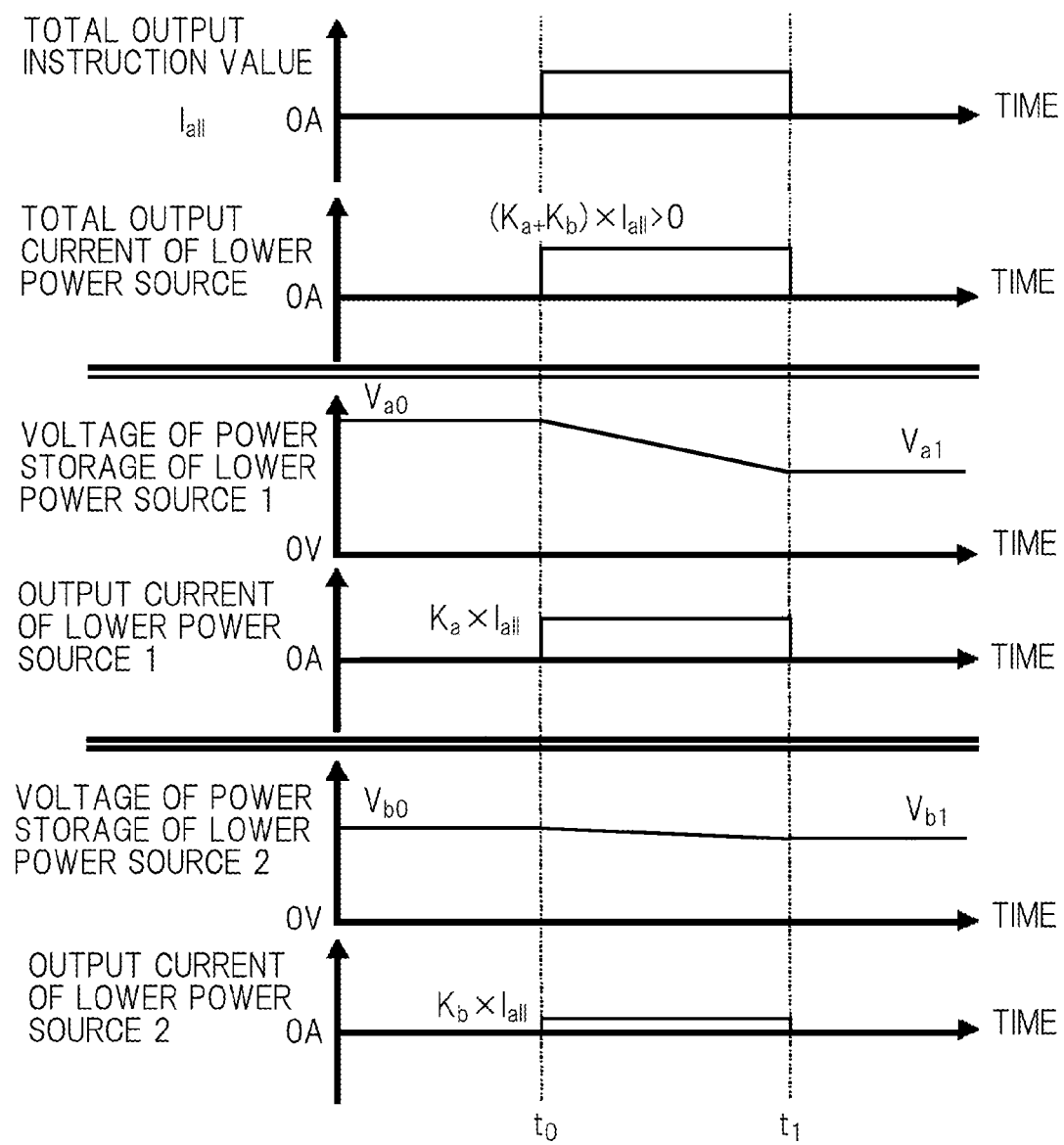
FIG. 4 is a diagram for explaining another example of the operation of the power system of the first exemplary embodiment.

FIG. 4 is a timing chart for explaining operation of the power system when both lower power sources 1 and 2 perform a discharging operation, among the operation states described with reference to FIG. 3.

As shown in FIG. 4, when the total output instruction value is positive, the total output current of lower power sources 1 and 2 is a discharge current of value $(K_a+K_b) \times I_{all}$ obtained by multiplying the total sum of the output sharing ratios of lower power sources 1 and 2 by the total output instruction value. Lower power sources 1 and 2 discharge currents $K_a \times I_{all}$ and $K_b \times I_{all}$ corresponding to output sharing ratios $K_a$ and $K_b$, respectively. In this case, the output voltages of power storages 11 and 21 of lower power sources 1 and 2 gradually drop. The output voltage of power storage 11 drops from $V_{a0}$ to $V_{a1}$, and the output voltage of power storage 21 drops from $V_{b0}$ to $V_{b1}$.

Operation of the power system when the total output instruction value is zero and negative among the operation states described with reference to FIG. 3 can also be expressed by similar timing charts.

FIG. 5 is a diagram showing operation states of the power system when total output instruction value $I_{all}$ is positive, zero, and negative, wherein output sharing ratio $K_a$ is greater than 0, output sharing ratio $K_b$ is smaller than 0, and sum $K_a+K_b$ is equal to or greater than 0. In FIG. 5, lower power sources other than lower power sources 1 and 2 are also included, and the sum of the output sharing ratios relative to all lower power sources is 1.

As shown in FIG. 5, when the total output instruction value is positive, lower power source 1 performs the discharging operation, and lower power source 2 performs the charging operation. Since the sum of the output sharing ratios relative to all lower power sources is 1, the total output current is a discharge current.

When the total output instruction value is zero, lower power sources 1 and 2 do not perform the charging and discharging operation, and the total output current is zero.

When the total output instruction value is negative, lower power source 1 performs the charging operation, and lower power source 2 performs the discharging operation. Since the sum of the output sharing ratios relative to all lower power sources is 1, the total output current is a charge current.

Figure 6:
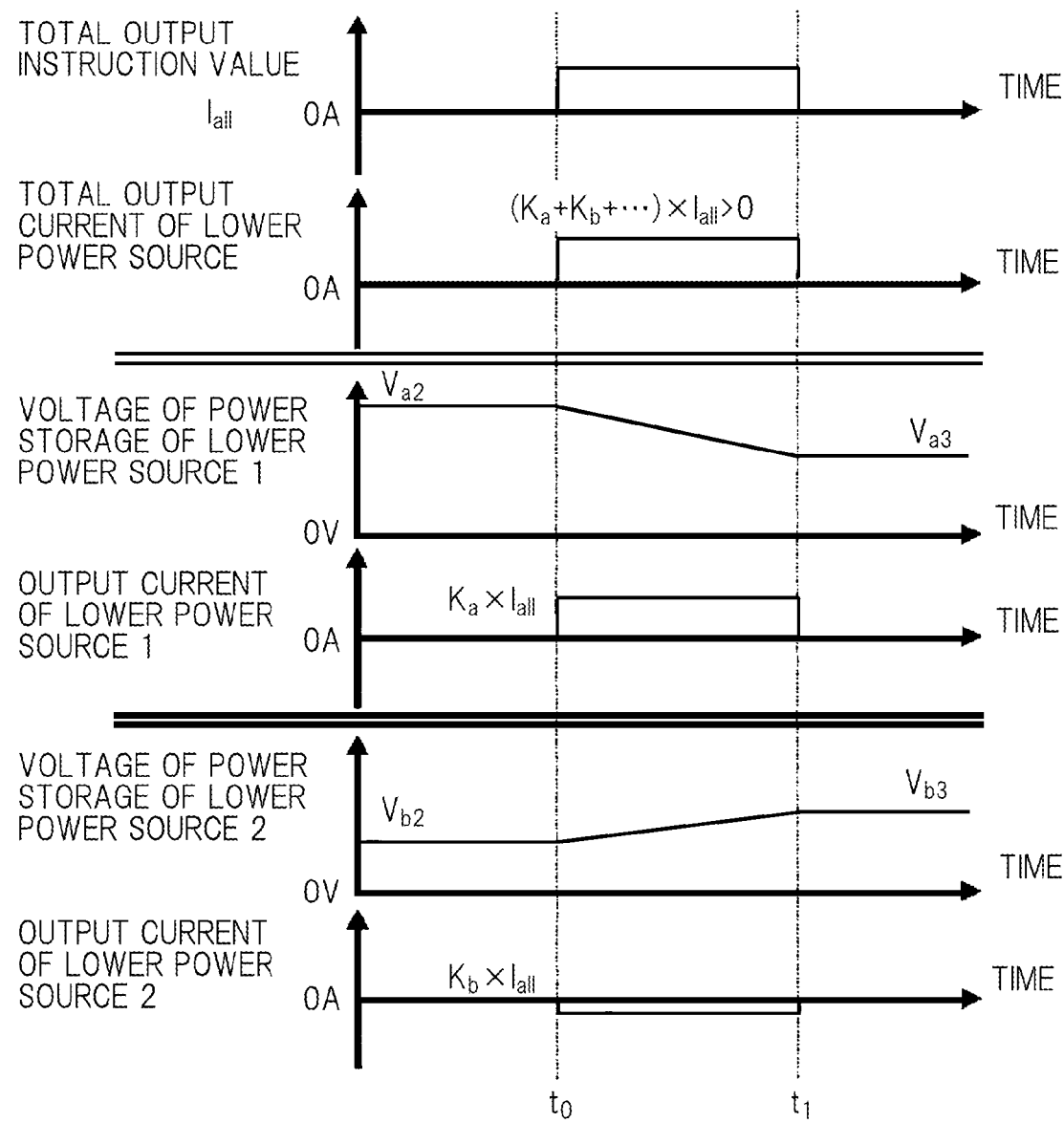
FIG. 6 is a diagram for explaining another example of the operation of the power system of the first exemplary embodiment.

FIG. 6 is a timing chart for explaining operation of the power system when both lower power sources 1 and 2 perform the discharging operation, among the operation states described with reference to FIG. 5.

As shown in FIG. 6, when the total output instruction value is positive, the total output current of lower power sources 1 and 2 is a discharge current of value $(K_a+K_b) \times I_{all}$ obtained by multiplying the total sum of the output sharing ratios of lower power sources 1 and 2 by the total output instruction value. Lower power source 1 discharges current $K_a \times I_{all}$ according to output sharing ratio $K_a$, and lower power source 2 charges current $K_b \times I_{all}$ according to output sharing ratio $K_b$. In this case, a cross current that transmits and receives power between lower power sources 1 and 2 is explicitly generated. The output voltage of power storage 11 drops from $V_{a2}$ to $V_{a3}$, and the output voltage of power storage 21 rises from $V_{b2}$ to $V_{b3}$.

Operation of the power system when the total output instruction value is zero and negative among the operation states described with reference to FIG. 5 can also be expressed by similar timing charts.

FIG. 7 is a diagram showing operation states of the power system when total output instruction value $I_{all}$ is positive, zero, and negative, wherein output sharing ratio $K_a$ is greater than 0, output sharing ratio $K_b$ is smaller than 0, and sum $K_a+K_b$ is 0.

As shown in FIG. 7, when the total output instruction value is positive, lower power source 1 performs the discharging operation, and lower power source 2 performs the charging operation. Since $K_a+K_b=0$, the total output current of lower power sources 1 and 2 is zero.

When the total output instruction value is zero, lower power sources 1 and 2 do not perform the charging and discharging operation, and the total output current is zero.

When the total output instruction value is negative, lower power source 1 performs the charging operation, and lower power source 2 performs the discharging operation. Since $K_a+K_b=0$, the total output current is zero.

Figure 8:
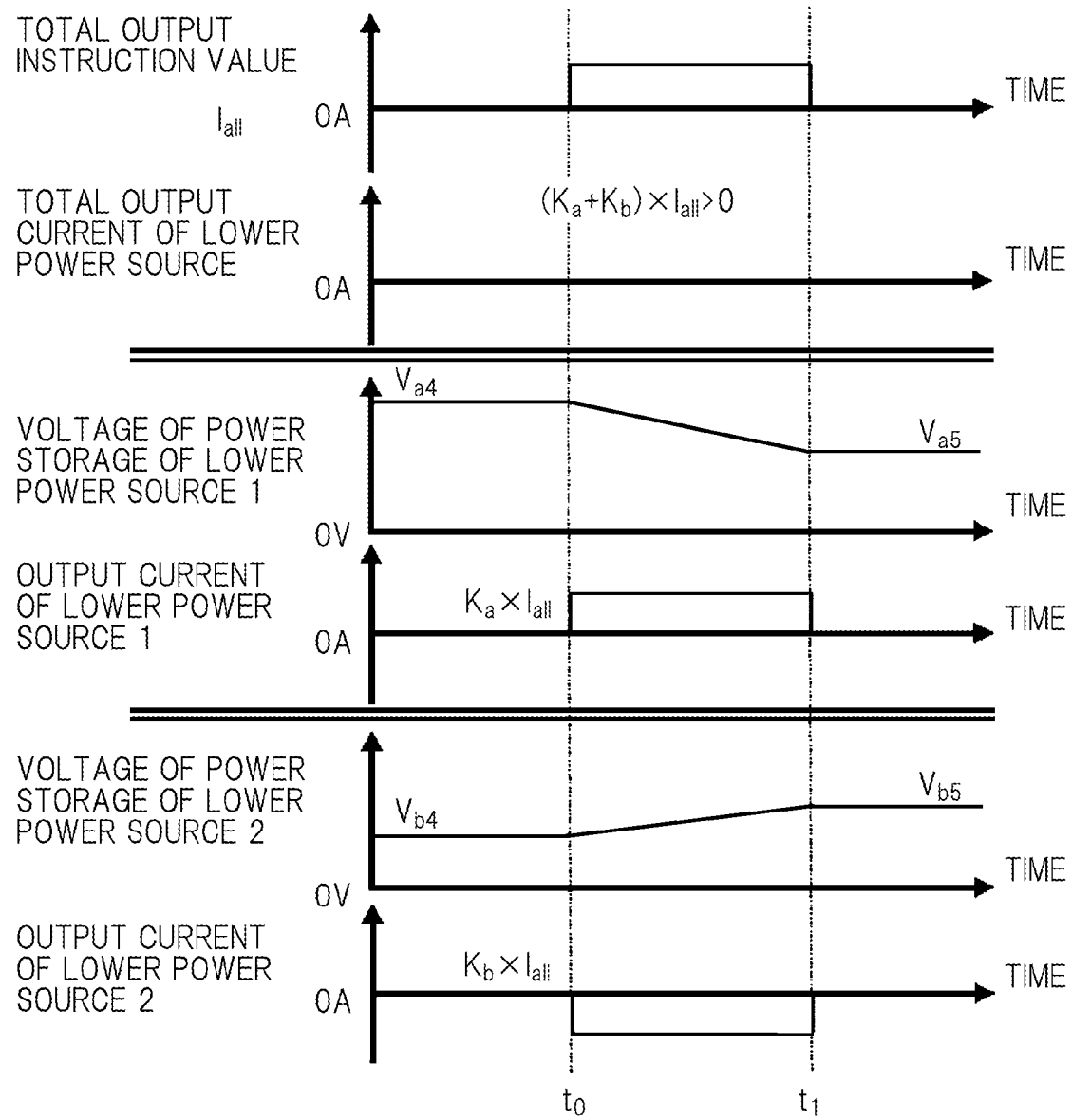
FIG. 8 is a diagram for explaining another example of the operation of the power system of the first exemplary embodiment.

FIG. 8 is a timing chart for explaining operation of the power system when both of lower power sources 1 and 2 perform the discharging operation, that is, when the total output instruction value is positive, among the operations described with reference to FIG. 7.

As shown in FIG. 8, when the total output instruction value is positive, the total output current of lower power sources 1 and 2 is zero, because $K_a+K_b=0$. At this time, lower power source 1 discharges current $K_a \times I_{all}$ according to output sharing ratio $K_a$, and lower power source 2 charges current $K_b \times I_{all}$ according to output sharing ratio $K_b$. In this case, a cross current that transmits and receives power between lower power sources 1 and 2 is explicitly generated. The output voltage of power storage 11 drops from $V_{a4}$ to $V_{a5}$, and the output voltage of power storage 21 rises from $V_{b4}$ to $V_{b5}$.

Operation of the power system when the total output instruction value is zero and negative among the operation states described with reference to FIG. 7 can also be expressed by similar timing charts. Operation of the power system when the total sum of the output sharing ratios of lower power sources 1 and 2 is $K_a+K_b=-1$ can be derived in the same way as the operation described with reference to FIGS. 5 and 6.

As described with reference to FIGS. 3 to 8, the output voltages of power storages 11 and 21 changes according to the output sharing ratios and the total output instruction value. Therefore, power converters 12 and 22 measure the power storage amounts of power storages 11 and 21 based on the output voltages of power storages 11 and 21 and notify output instruction section 32 of the power storage amounts through information channel 51. Output instruction section 32 adjusts the output sharing ratios of lower power sources 1 and 2 based on the power storage amounts of power storages 11 and 21. Since the measured voltage values change from moment to moment, output instruction section 32 adjusts the total output instruction value according to the measured voltage values.

For example, output instruction section 32 adjusts the output sharing ratios so that the amounts of power stored in power storages 11 and 21 are as uniform as possible or adjusts the output sharing ratios so that the amounts of power stored in power storages 11 and 21 are as non-uniform as possible. When a lower power source is newly added, output instruction section 32 may adjust the output sharing ratios so that the cross current flowing into the added lower power source is as low as possible.

Output instruction section 32 may also adjust an activation number, which is the number of lower power sources to be activated among the lower power sources, according to the measured voltage values.

Specifically, output instruction section 32 obtains the total output instruction value according to the measured voltage values, activates as many lower power sources as the activation number according to the total output instruction value, and adjusts the currents flowing through the connection terminals of the activated activation power sources.

In this case, output instruction section 32 adjusts the activation number according to the total output instruction value, such as by gradually increasing the activation number with an increase in the total output instruction value.

For example, output instruction section 32 increases the activation number when the total output instruction value exceeds a first threshold and reduces the activation number when the total output instruction value falls below a second threshold smaller than the first threshold after increasing the activation number. A plurality of first thresholds and second thresholds may be used.

If there are two first thresholds and two second thresholds, output instruction section 32 activates as many lower power sources as the first activation number when the total output instruction value is smaller than the first value. When the total output instruction value is equal to or greater than the first value and smaller than the second value that is greater than the first value, output instruction section 32 activates as many lower power sources as a second activation number greater than the first activation number. When the total output instruction value is equal to or greater than the second value, output instruction section 32 activates as many lower power sources as a third activation number greater than the second activation number. The first activation number, the second activation number, and the third activation number are numbers that allow outputting enough power to make the difference between the voltage command value and the measured voltage value equal to or smaller than the predetermined value.

If the total output instruction value is the fourth value, which is smaller than the second value and greater than the first value, when as many lower power sources as the third activation number are activated, output instruction section 32 reduces the activation number from the third activation number to the second activation number. If the total output instruction value is smaller than the third value that is smaller than the first value when as many lower power sources as the second activation number are activated, output instruction section 32 reduces the activation number to the first activation number.

The first value and the third value are examples of the first threshold, and the second value and the fourth value are examples of the second threshold.

Figure 9:
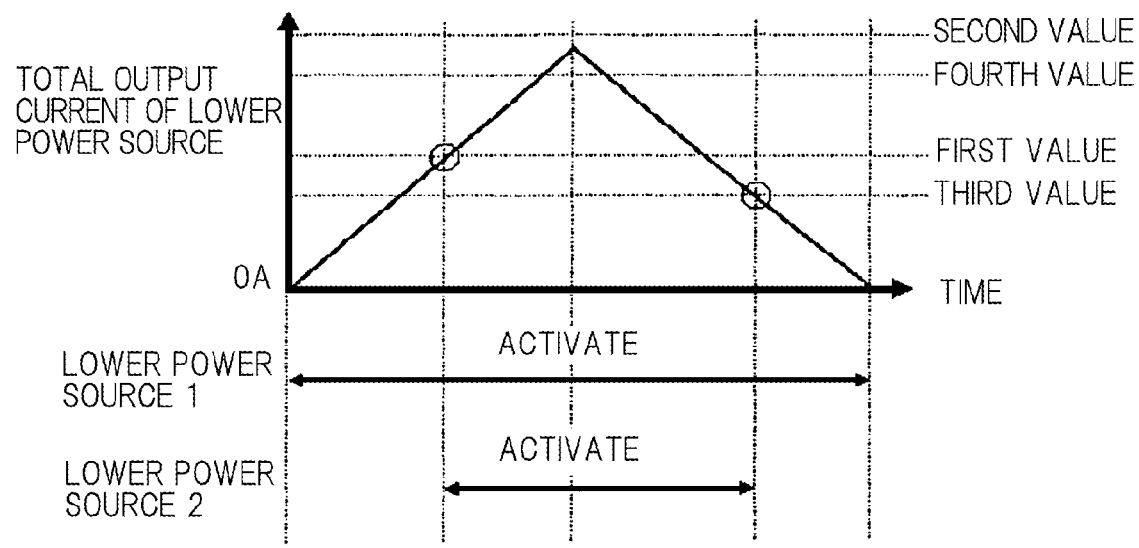
FIG. 9 is a diagram for explaining another example of the operation of the power system of the first exemplary embodiment.

FIG. 9 is a time chart for explaining a process of adjusting the activation number when there are just two lower power sources, lower power sources 1 and 2.

In the example of FIG. 9, output instruction section 32 activates lower power source 1 and terminates lower power source 2 when the total output instruction value is equal to or smaller than the first value. When the total output instruction value becomes greater than the first value, output instruction section 32 further activates lower power source 2 and increases the activation number to 2. Subsequently, when the total output instruction value becomes smaller than the third value, output instruction section 32 terminates lower power source 2 and reduces the activation number to 1. Since the activation number cannot be greater than 3 when there are two lower power sources, output instruction section 32 maintains the activation number at 2 even if the total output instruction value is greater than the second value.

Output instruction section 32 may adjust the total output instruction value when there is a failure or deficiency in amount of stored power in one of lower power sources 1 and 2.

Figure 10:
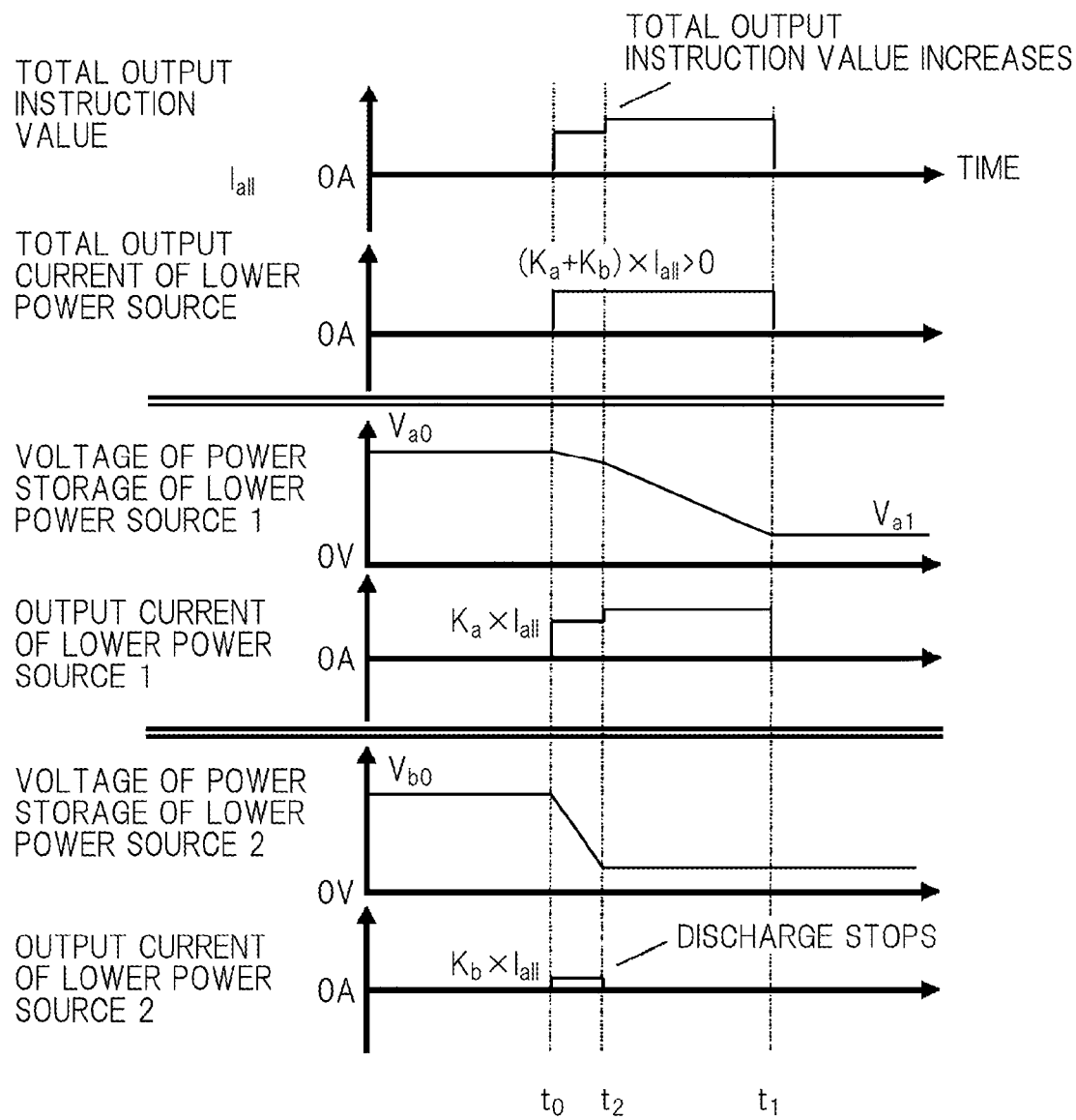
FIG. 10 is a diagram for explaining another example of the operation of the power system of the first exemplary embodiment.

FIG. 10 is a time chart for explaining operation of the power system in adjusting the total output instruction value.

The power supply capacity of one of power storages 11 and 12 may drop due to a failure or deficiency in amount of stored power in one of lower power sources 1 and 2, and lower power source 1 or 2 may suddenly enter a current output disable state in which the current of the desired value cannot be output. In this case, one of lower power sources 1 and 2 cannot supply power according to the output sharing ratio instructed by output instruction section 32. Therefore, output instruction section 32 increases the total output instruction value when the power supply capacity is equal to or smaller than a predetermined capacity.

In the example of FIG. 10, lower power sources 1 and 2 both discharge electricity from time t0 to t2, and there is a failure or deficiency in amount of stored power in lower power source 2 at time t2. The output voltage of lower power source 2 drops to equal to or smaller than the predetermined voltage value, and discharge is terminated. In this case, lower power source 2 cannot distribute current according to the output sharing ratio, and the total output current flowing through external connection terminals 41 cannot be maintained at a desired size.

Therefore, output instruction section 32 determines and detects that the fact that the output voltage of lower power source 2 is equal to or smaller than the predetermined voltage value indicates that the power supply capacity of lower power source 2 is equal to or smaller than the predetermined capacity and increases the total output instruction value to increase the output current output from lower power source 1 to maintain the total output current at the desired size.

As described, according to the exemplary embodiment, the power or the currents flowing through connection terminals 13 and 23 of lower power sources 1 and 2 are adjusted based on the measured voltage values of external connection terminals 41 and the power supply capacities of lower power sources 1 and 2 so that the measured voltage values are included in the predetermined voltage range. Therefore, the output power can be arbitrarily set, while the output voltages are stabilized.

Since the output sharing ratios of lower power sources 1 and 2 are adjusted according to the power supply capacities of lower power sources 1 and 2 in the exemplary embodiment, the output sharing ratios can be adjusted when lower power sources 1 and 2 are close to full charge or over discharge, and whether to use lower power sources 1 and 2 can be changed. Therefore, the degradation and the like of lower power sources 1 and 2 can be prevented.

Since the signs of the output sharing ratios can be used to individually adjust the directions of the currents distributed to connection terminals 13 and 23, the cross current between lower power sources 1 and 2 can be explicitly generated. The cross current generated when a lower power source is newly connected can be prevented, and the lower power source can be easily and newly connected to the power system.

In the exemplary embodiment, the total output instruction value is increased when the power supply capacity of one of the lower power sources becomes equal to or smaller than the predetermined capacity value. Therefore, even if the adjustment of the output sharing ratios is not on time because one of the lower power sources is suddenly discharged or because one of the lower power sources breaks down, other lower batteries can be used to perform parallel redundant operation, and the function of the constant voltage power source of the entire power system can be continued.

Next, a second exemplary embodiment will be described.

Figure 11:
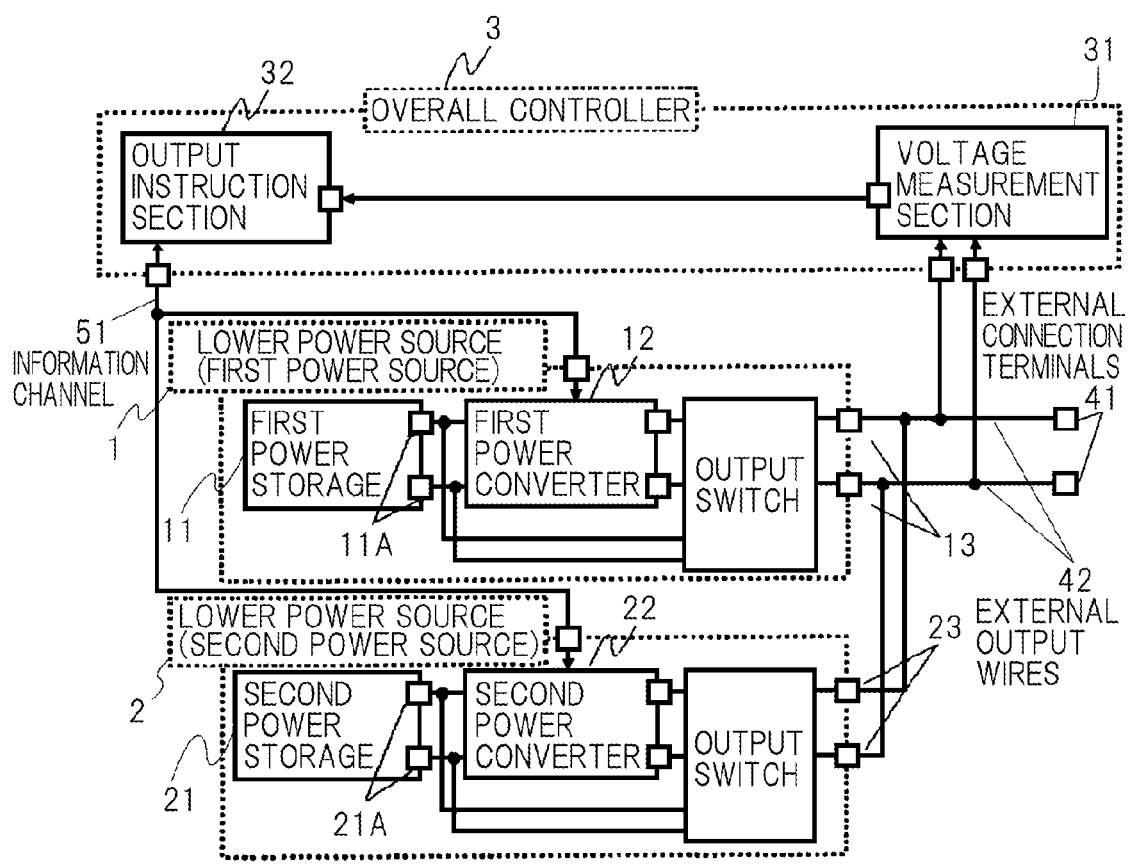
FIG. 11 is a block diagram showing a configuration of a power system of a second exemplary embodiment.

FIG. 11 is a block diagram showing a power system of the exemplary embodiment. Compared to the power system shown in FIG. 1, the power system shown in FIG. 11 is different in that lower power source 1 further includes output switch 14 and in that lower power source 2 further includes output switch 24.

Output switch 14 connects one of power storage 11 and power converter 12 to external connection terminals 41 to switch one of the output current of power storage 11 and the output current of power converter 12 to the output current of lower power source 1.

Output switch 24 connects one of the pairs of connection terminals of power storage 21 and power converter 22 to the pair of external connection terminals 41 to switch one of the output current of power storage 21 and the output current of power converter 22 to the output current of lower power source 2.

For each of lower power sources 1 and 2, output instruction section 32 uses output switch 24 to connect the power converter of the lower power source to the external connection terminals when the difference between the output voltage of the lower power source and the voltage command value is equal to or greater than a predetermined value and to connect the power supply source of the lower power source to the external connection terminals when the difference between the output voltage of the lower power source and the voltage command value is equal to or smaller than the predetermined value.

FIG. 12 is a time chart for explaining operation of the power system of the exemplary embodiment.

In the example of FIG. 12, output switches 14 and 24 connect power converters 12 and 22 to external connection terminals 41. Output instruction section 32 designates the output sharing ratios to generate a cross current from lower power source 1 to lower power source 2 when the output voltages of power storages 11 and 21 of lower power sources 1 and 2 are different.

In this case, from time t0 to t1, lower power source 1 performs the discharging operation, and lower power source 2 performs the charging operation. As a result, the output voltage of power storage 11 of lower power source 1 decreases from Va6 to Va7, and the output voltage of power storage 21 of lower power source 2 increases from Vb6 to Vb7. In this case, if Va7=Vb7 is satisfied, that is, if the output voltages of power storages 11 and 21 match, output instruction section 32 determines whether the difference between the output voltage and the voltage command value is equal to or smaller than a predetermined value.

As shown in FIG. 12, when the difference between the output voltage and the voltage command value is equal to or smaller than the predetermined value, output instruction section 32 uses output switches 14 and 24 to connect power storages 11 and 21 to external connection terminals 41. In this way, power storages 11 and 21 perform the charging and discharging operation according to the operation condition of the external apparatus while outputting voltages of the same value.

As described, according to the exemplary embodiment, there is no need to operate power converters 12 and 22 when power converters 12 and 22 do not have to be operated.

Therefore, standby power in power converters 12 and 22 as well as a power conversion loss in changing the directions and the sizes of the currents and the power flowing through connection terminals 11A and 21A of power storages 11 and 21 can be reduced, and power saving can be attained.

The configurations illustrated in the exemplary embodiments described above are just examples, and the present invention is not limited to the configurations.

For example, although power converters 12 and 22 have capacity measurement functions of measuring the power supply capacities of lower power sources 1 and 2 in the exemplary embodiments, the power system may include a capacity measurement section with capacity measurement functions, separately from power converters 12 and 22.

This application claims the benefit of priority based on Japanese Patent Application No. 2011-261982 filed Nov. 30, 2011, the entire disclosure of which is hereby incorporated by reference.

What is claimed is:

1. A power system comprising power sources, connection terminals of said power sources connected to an external connection terminal in parallel, the power system comprising:
   a voltage measurement section that measures a voltage value of said external connection terminal as a measured voltage value;
   a capacity measurement section that measures a power supply capacity of each power source; and
   an adjuster that adjusts power or a current flowing through each connection terminal based on the measured voltage value and the power supply capacity so that the measured voltage value is included in a predetermined voltage range, wherein
   when each power source is notified of a total instruction value indicating a total amount of power or a total amount of current that is to flow through said external connection terminal, and notified of a sharing ratio indicating a ratio of an amount of power or an amount of current, that is to flow through said connection terminal of said power source, to the total instruction value, said power source distributes power or a current according to the total instruction value and the sharing ratio to said connection terminal,
   said adjuster adjusts the power or the current flowing through each connection terminal by notifying each power source of the total instruction value and the sharing ratio to adjust the power or the current flowing through each connection terminal,
   said adjuster activates as many power sources as an activation number corresponding to the total instruction value among said power sources to adjust the power or the currents flowing through said connection terminals of said activated activation power sources,
   said adjuster increases the activation number to correspond to an increase in the total instruction value, and
   said adjuster increases the activation number when the total instruction value exceeds a first threshold and reduces the activation number when the total instruction value falls below a second threshold smaller than the first threshold after increasing the activation number.

2. The power system according to claim 1, wherein each power source comprises:
   a power supply source;
   a power converter that changes a direction and a size of the power and the current flowing through said connection terminal of said power supply source; and a switch that connects said power supply source or said power converter to said external connection terminal, wherein said adjuster uses said switch of each power source to connect said power supply source of said power source to said external connection terminal when an output voltage of said power supply source of said power source is included in the voltage range and to connect said power converter of said power source to said external connection terminal when the output voltage of said power supply source of said power source is not included in the voltage range.

3. The power system according to claim 1, wherein each power source distributes, to said connection terminal, power or a current having a value obtained by multiplying the total instruction value by the sharing ratio.

4. The power system according to claim 2, wherein each power source distributes, to said connection terminal, power or a current having a value obtained by multiplying the total instruction value by the sharing ratio.

5. The power system according to claim 1, wherein said adjuster adjusts the sharing ratio of each power source according to the power supply capacity of each power source.

6. The power system according to claim 2, wherein said adjuster adjusts the sharing ratio of each power source according to the power supply capacity of each power source.

7. The power system according to claim 3, wherein said adjuster adjusts the sharing ratio of each power source according to the power supply capacity of each power source.

8. The power system according to claim 4, wherein said adjuster adjusts the sharing ratio of each power source according to the power supply capacity of each power source.

9. The power system according to claim 1, wherein said adjuster increases the total instruction value when the power supply capacity of one of said power sources is equal to or smaller than a predetermined capacity value.

10. The power system according to claim 2, wherein said adjuster increases the total instruction value when the power supply capacity of one of said power sources is equal to or smaller than a predetermined capacity value.

11. The power system according to claim 3, wherein said adjuster increases the total instruction value when the power supply capacity of one of said power sources is equal to or smaller than a predetermined capacity value.

12. The power system according to claim 4, wherein said adjuster increases the total instruction value when the power supply capacity of one of said power sources is equal to or smaller than a predetermined capacity value.

13. The power system according to claim 5, wherein said adjuster increases the total instruction value when the power supply capacity of one of said power sources is equal to or smaller than a predetermined capacity value.

14. The power system according to claim 6, wherein said adjuster increases the total instruction value when the power supply capacity of one of said power sources is equal to or smaller than a predetermined capacity value.

15. The power system according to claim 7, wherein said adjuster increases the total instruction value when the power supply capacity of one of said power sources is equal to or smaller than a predetermined capacity value.

16. The power system according to claim 8, wherein said adjuster increases the total instruction value when the power supply capacity of one of said power sources is equal to or smaller than a predetermined capacity value.

17. A control method of a power system comprising power sources, connection terminals of said power sources connected to an external connection terminal in parallel, the power control method comprising:

measuring a voltage value of said external connection terminal as a measured voltage value;

measuring a power supply capacity of each power source;

adjusting power or a current flowing through each connection terminal based on the measured voltage value and the power supply capacity so that the measured voltage value is included in a predetermined voltage range, wherein when each power source is notified of a total instruction value indicating a total amount of power or a total amount of current that is to flow through said external connection terminal, and notified of a sharing ratio indicating a ratio of an amount of power or an amount of current, that is to flow through said connection terminal of said power source, to the total instruction value, said power source distributes power or a current according to the total instruction value and the sharing ratio to said connection terminal, and said adjusting occurs by notifying each power source of the total instruction value and the sharing ratio to adjust the power or the current flowing through each connection terminal;

activating as many power sources as an activation number corresponding to the total instruction value among said power sources to adjust the power or the currents flowing through said connection terminals of said activated activation power sources;

increasing the activation number to correspond to an increase in the total instruction value; and increasing the activation number when the total instruction value exceeds a first threshold and reduces the activation number when the total instruction value falls below a second threshold smaller than the first threshold after increasing the activation number.

* * * * *

UNITED STATES PATENT AND TRADEMARK OFFICE
CERTIFICATE OF CORRECTION

| | | |
|---|---|---|
| PATENT NO. | : 9,608,449 B2 | Page 1 of 1 |
| APPLICATION NO. | : 14/361426 | |
| DATED | : March 28, 2017 | |
| INVENTOR(S) | : Shingo Takahashi et al. | |

It is certified that error appears in the above-identified patent and that said Letters Patent is hereby corrected as shown below:

On the Title Page

Item (73) should read as follows:
-- Assignees: NEC Corporation, Tokyo (JP)
        Takasago Ltd., Kanagawa (JP) --.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*